United States Patent [19]

Hayduk

[11] Patent Number: 5,063,601
[45] Date of Patent: Nov. 5, 1991

[54] FAST-LEARNING NEURAL NETWORK SYSTEM FOR ADAPTIVE PATTERN RECOGNITION APPARATUS

[76] Inventor: John Hayduk, 15 Partridge Rd., White Plains, N.Y. 10605

[21] Appl. No.: 240,746

[22] Filed: Sep. 2, 1988

[51] Int. Cl.$^5$ .............................................. G06K 9/62
[52] U.S. Cl. ....................................... 382/14; 382/15; 382/50; 382/27; 382/36; 264/274.9
[58] Field of Search ........................ 382/14, 15, 50, 27, 382/36; 364/274.9

[56] References Cited

U.S. PATENT DOCUMENTS

| | | | |
|---|---|---|---|
| 3,209,328 | 9/1965 | Bonner | 382/15 |
| 3,601,811 | 8/1971 | Yoshino | 382/15 |
| 3,950,733 | 4/1976 | Cooper et al. | 382/15 |
| 4,774,677 | 9/1988 | Buckley | 382/15 |
| 4,802,103 | 1/1989 | Faggin et al. | 382/15 |
| 4,805,225 | 2/1989 | Clark | 382/15 |

*Primary Examiner*—Michael Razavi
*Attorney, Agent, or Firm*—Kane, Dalsimer, Sullivan, Kurucz, Levy, Eisele and Richard

[57] ABSTRACT

A neural network for an adaptive pattern recognition apparatus includes a plurality of comparators coupled to an input signal. Each comparators compares the input to a different offset voltage. The comparator output is fed to scaling multipliers and then summed to generate an output. The scaling multipliers receive weighing factors generated by using a specific equation selected to insure a fat-learning neural network.

1 Claim, 4 Drawing Sheets

FAST-LEARNING NEURAL NETWORK SYSTEM FOR ADAPTIVE PATTERN RECOGNITION APPARATUS

BACKGROUND OF INVENTION

The present invention relates to a method and an apparatus for recognizing patterns. In particular, the present invention relates to a single input, single output network system capable of learning to respond to particular values of input. The present invention is a comparator. network.

To date, no one has been able to successfully build a computer system which can autonomously see, hear, feel, move avoiding collision, etc.

Much work has been done in the fields of image recognition, speech recognition, collision avoidance, etc., and, although much progress has been made in these fields, no system has been developed which can see, hear, or move with the diversity and grace of a human or of many other animals. It is becoming apparent therefore that computers just cannot perform certain tasks, or at the very least do not seem to be well suited for human-like performance in these areas.

SUMMARY OF THE INVENTION

Accordingly it is desirable to develop a new and improved method of processing which mimics the processing methods of the human brain. While neural network systems have been developed, none to date are capable of learning at a rapid speed. While the operation of the brain may not be fully understood, the architecture of the brain is so perfectly suited to performing these tasks, that systems should be designed to imitate this structure and match its capability.

In the crudest description, the brain is composed of somewhere in the order of a hundred billion neurons with many connected to thousands of its neighbors. There are somewhere around $10^{14}$ connections in the human brain. A typical neuron has inputs from many other neurons, and a single output which is sent as input to many other neurons. Each neuron, in general, performs a fairly simple operation on its inputs, and although different neurons may perform different tasks, it is believed that the task of a particular neuron does not change with time. The connections between the neurons typically amplify or attenuate the signal received from one neuron before sending it to the next. It is the amount of amplification (or attenuation) in each connection, and the pattern of connectivity of the network of neurons that enables the brain to associate a particular set of stimuli with another or with a thought, action or concept. It is in these connections, then, where our knowledge and intelligence resides. The amplitude of each connection, called a connection weight, is variable. As the weights change, so does our knowledge and intelligence. We learn by changing connection weights, by continually updating a hundred trillion amplifier gains and constantly tweeking an incredibly complicated system until we know and understand everything we can.

Thus, it is a principal object of the present invention to develop a system in which the connection weights which enhance or amplify signals between neurons (comparators) and the output are rapidly varied in a circuit configuration in which the comparators are evenly distributed in a parallel configuration. This object is achieved by providing a network system, containing a level of comparators which are distributed about the space of the single input to the network. The comparators inform the network where the input is along the input space and all learning is performed by means of a feedback circuit. The feedback circuit is referred to as the update circuit and it detects and feeds any error in the output voltage through the circuitry to vary the connection weight or amplifier gain associated with each neuron or comparator.

It is a further object to provide a new and improved neural network using comparators in the circuitry shown in FIGS. 1 and 2 having ranges from $-d$ to d, distribution of biases, $V_e$, and an update function, $F_u$.

BRIEF DESCRIPTION OF THE DRAWINGS

For a fuller understanding of the nature and the object of the invention, reference should be had to the following detailed description, taken in connection with the accompanying drawings, in which.

DETAILED DESCRIPTION OF THE PREFERRED EMBODIMENT

Figure 1:
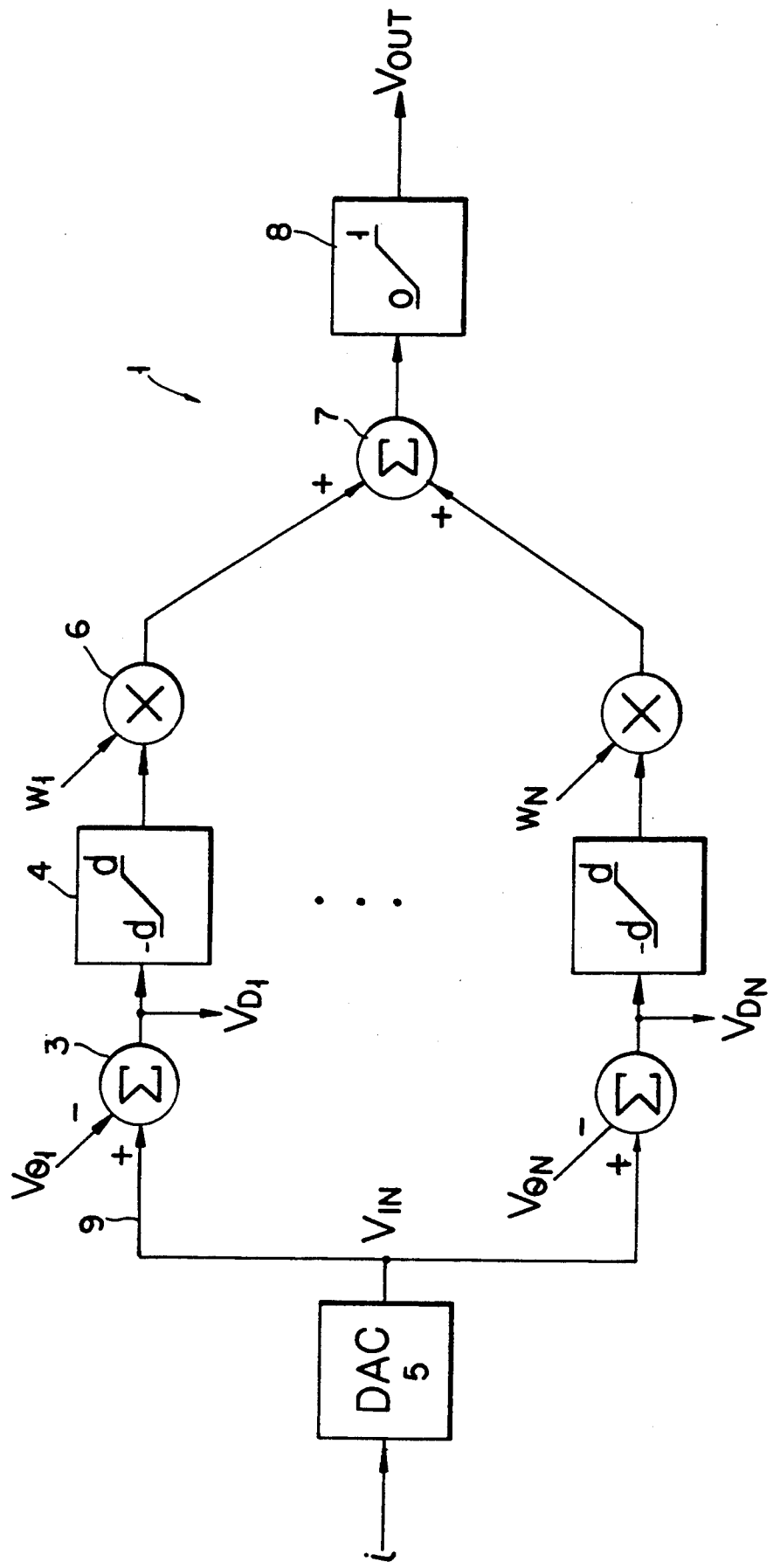
FIG. 1 is the recall circuit of the present invention.

Referring, now to the drawings, FIG. 1 discloses the recall circuit 1 portion of the present invention network.

The recall circuit 1 has an input i which is fed into a digital to analog converter 5 converting the input signal into an analog signal.

Figure 4A:
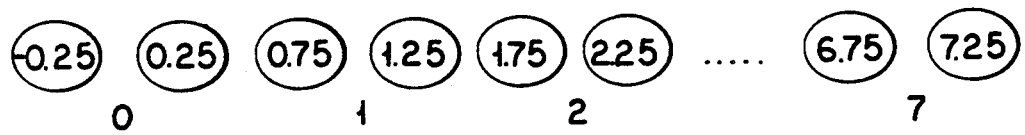
FIG. 4A shows the distribution of thresholds in accordance with the teachings of the present invention.
Figure 4B:
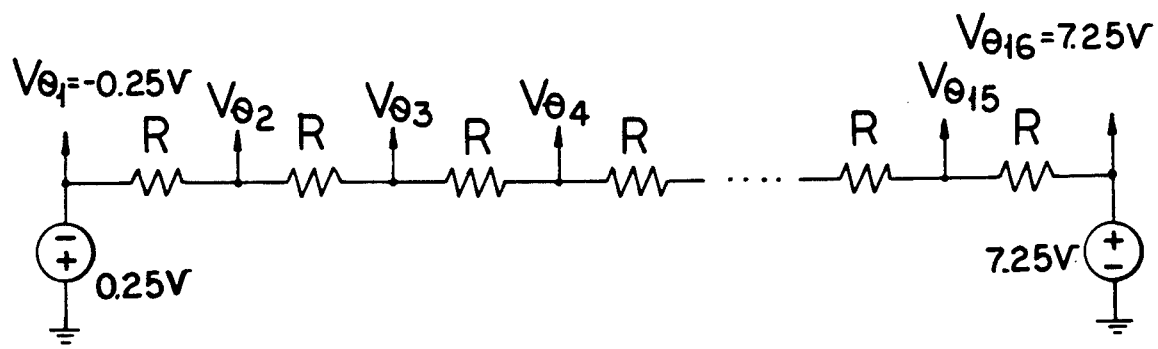
FIG. 4B shows the threshold generation circuit.

The recall circuit has n branches, one for each neuron. The neurons are represented by comparators formed as summers 3 and threshold circuits 4. The analog signal is fed to each of the n branches and into summer circuits 3 along with an offset voltage $V_\theta$ associated with a particular comparator. $V_\theta$ is a predetermined voltage value for each associated comparator and is taken from a voltage-divider, resistive circuit. Referring to FIGS. 4A and 4B, assume there is an input ranging from 0 to 7 where that input consists of integers only. The threshold would be set up as shown in FIG. 4A where the numbers in circles represent the biases (thresholds) of the neurons. Thus there are 16 neurons (comparators) with distance, d, equal to 0.5. These values are produced by the circuit of FIG. 4B. Thus $V_-$, provides a reference bias voltage for the first comparator on branch line 9.

Threshold circuit 4 performs a linear threshold operation which can be realized with a simple op-amp circuit. If the input is greater than d, the output is d. If the input is less than $-d$, the output is $-d$. Otherwise, the output is the same as the input.

The threshold valves of $+d$ and $-d$ represent the distance between two adjacent comparator biases. $V_{d1}$ through $V_{dn}$ which are output from the summers 3 each represent the difference in voltage between the input level $V_{in}$ and the bias value for the associated comparator.

The signal is then fed from the threshold circuit into a multiplier 6. A connection weight w associated with each comparator is also input into the corresponding branch and the product signal for each of the n branches are cumulatively summed in summer 7 and then fed to threshold circuit 8, which outputs $V_{out}$.

Figure 2:
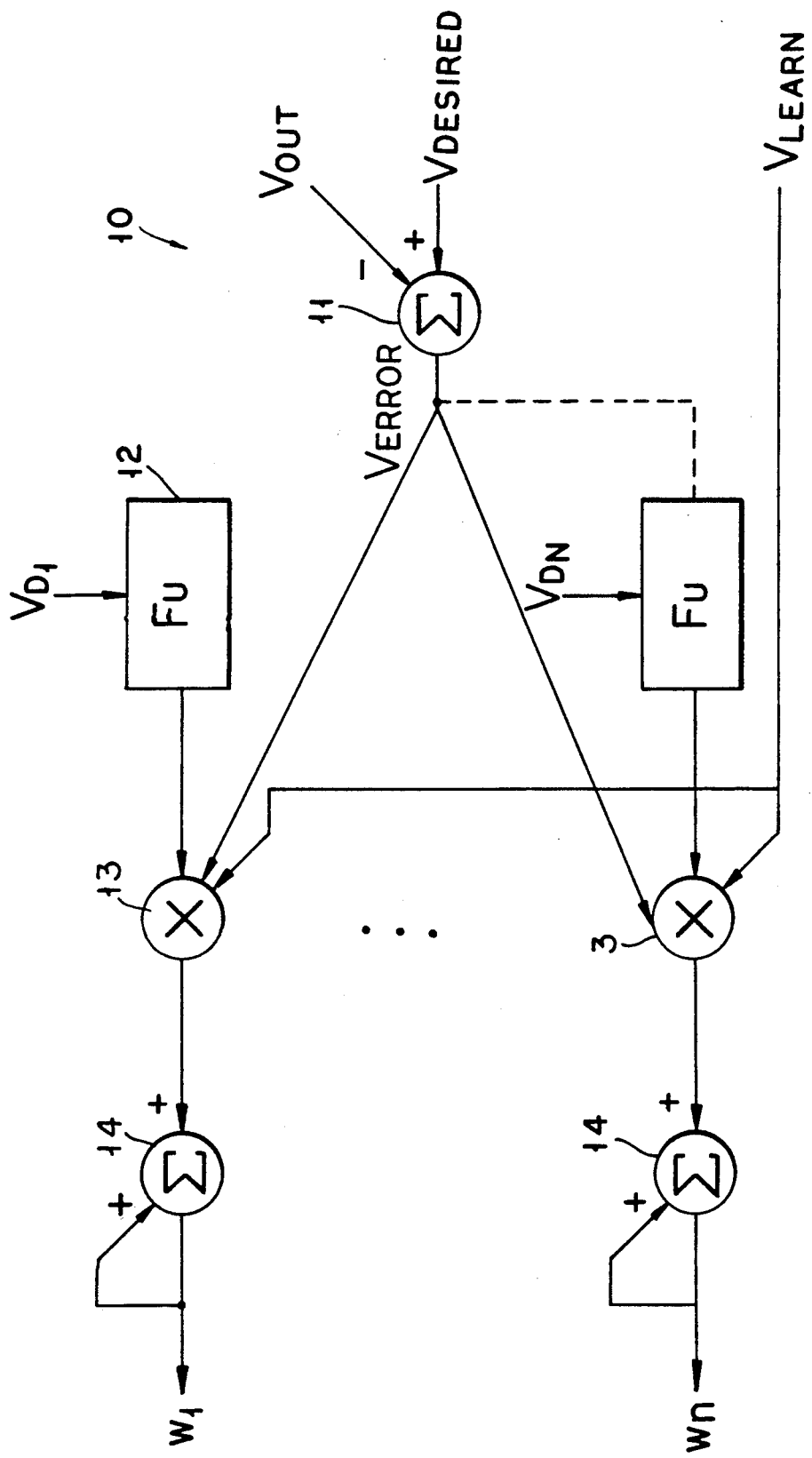
FIG. 2 is the update circuit of the present invention.
Figure 5:
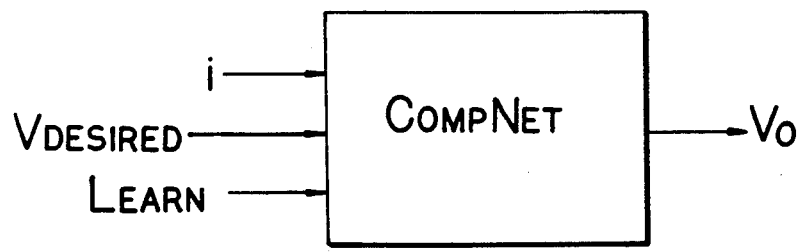
FIG. 5 is a block diagram of the present invention.

FIG. 2 discloses the update circuit 10 which determines the value of the connection weights w. The update circuit 10 provides an error correction feedback signal to the recall circuit 1, rapidly varying the connection weight w based upon the voltage difference between $V_{out}$ and the desired voltage, $V_{desired}$ for a particular input signal. V desired is supplied from another source. FIG. 5 shows a block diagram of inputs and outputs to the present invention referred to as the Comparator Network or CompNet.

V learn is an enabling voltage and either enables or disables the update circuit depending upon whether or not the network is in a training mode. Thus if V-learn is 1 volt the circuit is in a training mode and learning, and V learn is 0 volts when it is not. Therefore when V-learn is 0 volts, the connection weights, w are not updated.

V error is the error voltage output from the summer 11 and represents the voltage difference between V out and V desired. Thus if V out=V desired, there is no error voltage, V error and no correction to the weights w.

V dl through $V_{dn}$ are the output voltages of summers 3, representing the difference between the input voltage V in and the respective bias voltage V for each comparator. Each $V_d$ is input into a corresponding function block 12, $F_u$ which has the shape shown in FIG. 3. The $F_u$ block transforms $V_d$ in accordance with the equation:

$$F_u(V_{dk}) = \eta SGN(V_{dk}) e^{-P/dlV_{dk}l}$$

where $0 < \eta \leq 1$ is called the learning constant, SGN is the signum function and returns the sign of the argument, K ranges from 1 to n, and P is a shape constant which governs the shape of the response. P=0.63 works well. Further $\eta$ can be used to slow learning. Typically, however $\eta = 1$.

Figure 3:
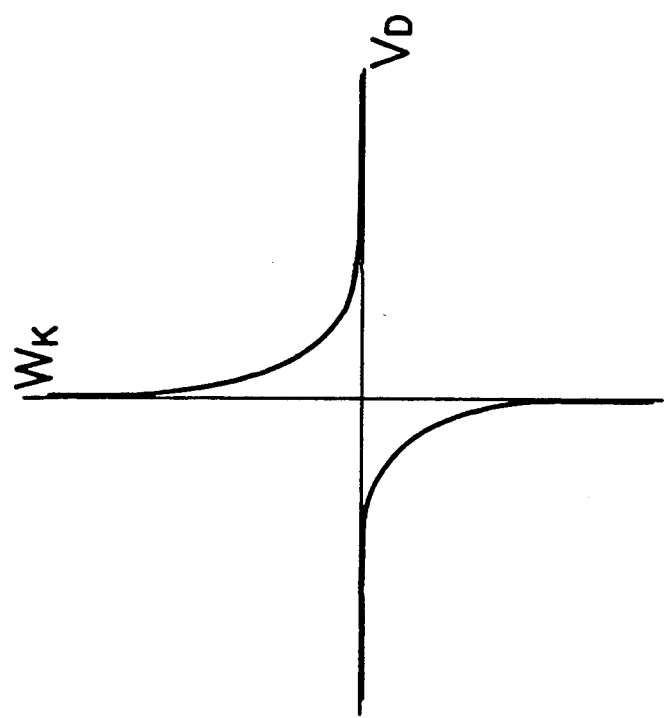
FIG. 3 is a graph of the function block $F_u$.

Thus, $F_u$ plots each $V_d$ on the weighted distribution curve of FIG. 3.

The function block 12 serves to evenly distribute the connection weights $w_l$ through $w_n$ along the curve shown on FIG.3. Thus, the product output from the function block 12 is multiplied with V error and V learn into multiplier 13, and then fed to summer 14. The previous connection weight is added to summer 14 and the corrected connection weight is then input to the recall circuit 1 as shown in FIG. 1

The invention thus provides a circuit for rapidly correcting the connection weights and permitting the recall circuit to be configured in parallel fashion so that there are n comparators arranged in parallel.

I do not limit myself to any particular details of construction set forth in this specification and illustrated in the accompanying drawings, as the same refers to and sets forth only certain embodiments of the invention, and it is observed that the same may be modified without departing from the spirit and scope of the invention.

Having thus described the invention, what I claim as new and desire to be secured by Letters Patent is as follows:

1. A neural network system comprising:
   a recall circuit including input means and output means and a plurality of parallel comparator circuits connected to said input means, each said comparator including a summing circuit for summing an input signal from said input means with an offset voltage, a threshold detector coupled to said summing circuit for detecting when the summer output is within a preselected range and a multiplier for multiplies the threshold circuit output by a weight "wherein said threshold circuit generates a threshold output which equals to the summer output and other wise equals to one of high and low threshold level".
   a series resistor circuit for generating said offset voltages; and
   a feedback circuit including a plurality of function blocks, each function block being coupled to one of said comparator circuits for operating on a comparator signal from one said comparator circuit in accordance with a preselected function, said feedback circuit generating said weights for said multiplies;
   wherein said feedback circuit has feedback input means for receiving a learning signal and connected to said input means and output means for an output signal, said feedback circuit recursively calculating said weights in the presence of said learning signal by changing said weights until said output signal equals a reference signal said feedback input circuit includes feedback summer for receiving said output signal and said reference signal, said feedback input circuit includes feedback summer for receiving said output signal and said reference signal, said feedback summer generating an error signal equal to the difference between said output and said reference signals, and feedback multipliers for multiplying the outputs of said function blocks with said error signal in the presence of said learn signal, said function block operates on each said comparator signal in accordance with the equation:

$$F_u(V_{dk}) = \eta SGN(V_{dk}) e^{-P/dlV_{dk}l}$$

where $0 < \eta \leq 1$ is called the learning constant, SGN is the signum function and returns the signal of the argument, K ranges from 1 to n. and P is a shape constant which governs the shape of the response.

* * * * *